(12) United States Patent
Witz et al.

(10) Patent No.: US 8,225,820 B2
(45) Date of Patent: Jul. 24, 2012

(54) HOSE

(75) Inventors: Joel Aron Witz, Newdigate (GB); David N. Cox, Hertford (GB)

(73) Assignee: BHP Billiton Petroleum Pty Ltd. (AU)

( * ) Notice: Subject to any disclaimer, the term of this patent is extended or adjusted under 35 U.S.C. 154(b) by 600 days.

(21) Appl. No.: 12/300,115

(22) PCT Filed: May 8, 2007

(86) PCT No.: PCT/GB2007/001689
§ 371 (c)(1),
(2), (4) Date: May 15, 2009

(87) PCT Pub. No.: WO2007/129092
PCT Pub. Date: Nov. 15, 2007

(65) Prior Publication Data
US 2009/0320951 A1 Dec. 31, 2009

(30) Foreign Application Priority Data
May 8, 2006 (GB) .................................. 0609079.9

(51) Int. Cl.
*F16L 11/00* (2006.01)
(52) U.S. Cl. ......... 138/125; 138/138; 138/133; 138/137
(58) Field of Classification Search ............... 138/138, 138/125, 143, 133
See application file for complete search history.

(56) References Cited

U.S. PATENT DOCUMENTS

| | | | |
|---|---|---|---|
| 956,076 A | 4/1910 | Greenfield | |
| 1,178,559 A | 4/1916 | Vautier | |
| 1,588,606 A | 6/1926 | Oden | |
| 1,599,775 A | 9/1926 | Lamb et al. | |
| 1,607,909 A | 11/1926 | Oden | |
| 1,785,345 A | 12/1930 | Hasemann | |
| 1,810,032 A | 6/1931 | Schulthess | |
| 1,901,330 A | 3/1933 | Poberejsky | |
| 1,911,486 A | 5/1933 | Bacheldor et al. | |
| 2,011,781 A | 8/1935 | Tabozzi | |
| 2,184,984 A | 12/1939 | Van Stone et al. | |
| 2,371,363 A | 3/1945 | Smith | |
| 2,610,869 A | 9/1952 | Percy | |
| 2,661,026 A | 12/1953 | Schulthess | |
| 2,706,494 A | 4/1955 | Morse | |
| 2,825,364 A | 3/1958 | Cullen et al. | |
| 2,829,671 A | 4/1958 | Ernst et al. | |

(Continued)

FOREIGN PATENT DOCUMENTS

CN 1441884 9/2003

(Continued)

OTHER PUBLICATIONS

Patent Application entitled, "Improvements Relating to Pipe", by Joel Aron Witz filed Mar. 12, 2010 as U.S. Appl. No. 12/677,852.

(Continued)

*Primary Examiner* — Patrick F Brinson
(74) *Attorney, Agent, or Firm* — Brinks Hofer Gilson & Lione; G. Peter Nichols

(57) ABSTRACT

A hose comprising a tubular body of flexible material arranged between elongate inner and outer gripping members, wherein the tubular body comprises a sealing layer arranged between inner and outer reinforcing layers, and wherein the outer gripping member is made of a flexible non-rigid material capable of being wound around the tubular body.

25 Claims, 4 Drawing Sheets

U.S. PATENT DOCUMENTS

| | | | |
|---|---|---|---|
| 2,858,147 A | 10/1958 | Guarnaschelli | |
| 2,940,778 A | 6/1960 | Kaiser | |
| 3,004,779 A | 10/1961 | Cullen et al. | |
| 3,140,106 A | 7/1964 | Thomas et al. | |
| 3,189,370 A | 6/1965 | Marshail | |
| 3,240,643 A | 3/1966 | Schroeder et al. | |
| 3,287,194 A | 11/1966 | Waddell, Jr. | |
| 3,318,620 A | 5/1967 | Cullen et al. | |
| 3,333,325 A | 8/1967 | Stanley | |
| 3,462,177 A | 8/1969 | Skinner et al. | |
| 3,538,728 A | 11/1970 | Tribey | |
| 3,603,719 A | 9/1971 | Lejeune | |
| RE28,155 E | 9/1974 | Dow et al. | |
| 3,856,052 A | 12/1974 | Feucht | |
| 3,919,026 A | 11/1975 | Mizutani et al. | |
| 4,033,612 A | 7/1977 | Chevalier | |
| 4,063,757 A | 12/1977 | Fuhrmann | |
| 4,323,089 A | 4/1982 | Kadono et al. | |
| 4,330,143 A | 5/1982 | Reneau | |
| 4,344,908 A | 8/1982 | Smith et al. | 264/203 |
| 4,351,366 A | 9/1982 | Angioletti | |
| 4,377,186 A | 3/1983 | Genini et al. | |
| 4,411,845 A | 10/1983 | Tanahashi | 261/65 |
| 4,422,993 A | 12/1983 | Smith et al. | 264/210.8 |
| 4,430,383 A | 2/1984 | Smith et al. | 428/364 |
| 4,436,689 A | 3/1984 | Smith et al. | 264/204 |
| 4,445,543 A | 5/1984 | Mead | |
| 4,634,153 A | 1/1987 | Kishton | |
| 4,826,354 A | 5/1989 | Adorian | |
| 4,924,679 A | 5/1990 | Brigham et al. | |
| 4,950,001 A | 8/1990 | Briggs | |
| 5,182,147 A | 1/1993 | Davis | |
| 5,480,193 A | 1/1996 | Echols et al. | |
| 5,485,870 A | 1/1996 | Kraik | |
| 5,639,128 A | 6/1997 | Belcher | |
| 5,647,563 A | 7/1997 | Gantner et al. | |
| 5,685,576 A | 11/1997 | Wolfe et al. | |
| 5,698,278 A | 12/1997 | Emond et al. | |
| 5,860,682 A | 1/1999 | Belcher | |
| 5,893,681 A | 4/1999 | Boden et al. | |
| 6,110,550 A | 8/2000 | Jarrin et al. | |
| 6,334,466 B1 | 1/2002 | Jani et al. | |
| 6,659,510 B1 | 12/2003 | Ikegami et al. | |
| 6,874,542 B2 | 4/2005 | Mayau et al. | |
| 6,923,477 B2 | 8/2005 | Buon et al. | |
| 7,243,686 B2 | 7/2007 | Burke et al. | |
| 7,712,792 B2 | 5/2010 | Burke et al. | |
| 7,735,524 B2 | 6/2010 | Burke et al. | |
| 7,743,792 B2 | 6/2010 | Burke et al. | |
| 2003/0178085 A1 | 9/2003 | Burke et al. | |
| 2004/0066035 A1 | 4/2004 | Buon et al. | |
| 2004/0112454 A1 | 6/2004 | Takagi | |
| 2004/0146676 A1 | 7/2004 | Ikemoto | |
| 2004/0256016 A1 | 12/2004 | Arima et al. | |
| 2007/0024051 A1 | 2/2007 | Witz et al. | |
| 2010/0059133 A1 | 3/2010 | Witz et al. | |
| 2010/0180976 A1 | 7/2010 | Witz et al. | |
| 2010/0183371 A1 | 7/2010 | Witz et al. | |
| 2010/0224277 A1 | 9/2010 | Witz et al. | |
| 2010/0229991 A1 | 9/2010 | Witz et al. | |
| 2010/0229992 A1 | 9/2010 | Witz et al. | |

FOREIGN PATENT DOCUMENTS

| | | |
|---|---|---|
| CN | 1732352 | 2/2006 |
| DE | 1 425 453 | 7/1969 |
| DE | 2 431 277 | 1/1975 |
| DE | 2 948 416 | 6/1981 |
| DE | 3 440 459 | 5/1986 |
| DE | 3440459 A1 | 5/1986 |
| DE | 9 207 276 | 10/1992 |
| DE | 9 407 409 | 7/1994 |
| DE | 102005046367 A1 | 4/2006 |
| EP | A2 0032352 | 7/1981 |
| EP | 0076540 A1 | 4/1983 |
| EP | 183285 A1 | 6/1986 |
| EP | A1 0215507 | 3/1987 |
| EP | 0 241 656 | 10/1987 |
| EP | 0438831 A1 | 7/1991 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1 344 969 | 9/2003 |
| EP | 1 428 748 | 6/2004 |
| FR | 1499956 | 4/1966 |
| FR | 2194906 | 3/1974 |
| FR | 2235324 | 6/1974 |
| FR | 2753257 | 3/1998 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 | 12/2001 |
| GB | 2366345 | 3/2002 |
| GB | 2408307 | 5/2005 |
| JP | 1283494 | 11/1989 |
| JP | 03-075132 | 3/1991 |
| JP | 08011138 | 1/1996 |
| JP | 08336845 | 12/1996 |
| JP | 11325333 | 11/1999 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 0196772 | 12/2001 |
| WO | WO 2004044472 A1 | 5/2004 |
| WO | WO 2004079248 A1 | 9/2004 |
| WO | WO 2005/119150 | 12/2005 |
| WO | WO 2006/044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Hose End Fittings", by Joel Aron Witz filed Jun. 15, 2010 as U.S. Appl. No. 12/667,853.
Patent Application entitled, "Hose", by Joel Aron Witz filed Jun. 10, 2010 as U.S. Appl. No. 12/667,854.
International Search Report and Written Opinion for PCT Application Serial No. PCT/GB2008/003098, dated Dec. 12, 2008, 6 pages.
International Preliminary Report on Patentability for PCT Application Serial No. PCT/GB2008/003098, dated Mar. 16, 2010, 5 pages.
International Search Report and Written Opinion for PCT Application Serial No. PCT/GB2008/003135, dated Dec. 12, 2008, 7 pages.
International Preliminary Report on Patentability for PCT Application Serial No. PCT/GB2008/003135, dated Mar. 16, 2010, 6 pages.
International Search Report and Written Opinion for PCT Application Serial No. PCT/GB2008/003121, dated Dec. 15, 2008, 10 pages.
International Preliminary Report on Patentability for PCT Application Serial No. PCT/GB2008/003121, dated Mar. 16, 2010, 7 pages.
International Search Report for PCT Application Serial No. PCT/GB01/02562.

International Preliminary Examination Report for PCT Application Serial No. PCT/GB01/02562, published on Dec. 20, 2001.
International Preliminary Report on Patentability for PCT Application Serial No. PCT/GB07/002446, dated Jan. 15, 2009.
International Preliminary Report on Patentability and Written Opinion for PCT Application Serial No. PCT/GB2007/003063, dated Feb. 26, 2009.
International Preliminary Report on Patentability and Written Opinion for PCT Application Serial No. PCT/GB2007/003058, dated Feb. 26, 2009.
Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

HOSE

BACKGROUND OF THE INVENTION

1. Field of the Invention

This invention relates to hose, and more particularly relates to composite hose having an improved outer gripping member. The invention is especially concerned with hose which can be used in cryogenic conditions. Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refuelling in formula 1; and conveying corrosive fluids, such as sulphuric acid.

2. Description of the Related Art

It is well known to use hose for the transport of fluids, such as liquefied gases, at low temperature. Such hose is commonly used to transport liquefied gases such as liquefied natural gas (LNG) and liquefied propane gas (LPG).

In order for the hose to be sufficiently flexible, any given length must be at least partially constructed of flexible materials, i.e., non-rigid materials.

The structure of such hose generally comprises a tubular body of flexible material arranged between an inner and outer helically wound steel retaining wires. It is conventional for the two wires to be wound at the same pitch, but to have the windings displaced by half a pitch width from one another. The tubular body typically comprises inner and outer layers with an intermediate sealing layer. The inner and outer layers provide the structure with the strength to carry the fluid therein. Conventionally, the inner and outer layers of the tubular body comprise fabric layers formed of a polyester such as polyethylene terephthalate. The intermediate sealing layer provides a seal to prevent the fluid from penetrating the hose, and is typically a polymeric film.

The retaining wires are typically applied under tension around the inside and outside surfaces of the tubular body. The retaining wires act primarily to preserve the geometry of the tubular body. Furthermore, the outer wire may act to restrain excessive hoop deformation of the hose under high pressure. The inner and outer wires may also act to resist crushing of the hose.

A hose of this general type is described in European patent publication no. 0076540A1. The hose described in this specification includes an intermediate layer of biaxially oriented polypropylene, which is said to improve the ability of the hose to resist the fatigue caused by repeated flexing.

Another hose is described in GB-2223817A. The hose described in this publication is a composite hose comprising an inner helical metallic core, a plurality of layers of plastics material fibres and films wound on the core, at least one layer of glass cloth and at least one layer of aluminium foil disposed adjacent one another and wound onto the plastics material, and an outer helical metallic former. This hose is said to be suitable for transporting flammable fuels and oils.

Various improvements to composite hose are described in our WO01/96772, WO 2004/044472 and WO 2004/079248, the contents of which are incorporated by reference.

FR2235324 discloses a flexible pipe comprising a plastics layer and a reinforcing layer are sandwiched between 2 coils. The coils are preferably plastics materials.

DE3440459 discloses a hose comprising protective inlays sandwiched between inner and outer spirals of metal or plastics materials.

FR1499956 discloses another pipe. According to a first aspect of the invention there is provided a hose comprising a tubular body of flexible material arranged between inner and outer elongate gripping members, wherein the tubular body comprises a sealing layer and at least one reinforcing layer, and wherein the outer gripping member is made of a flexible non-rigid material capable of being wound around the tubular body.

BRIEF DESCRIPTION OF THE DRAWINGS

Reference is now made to the accompanying drawings, in which.

DETAILED DESCRIPTION OF THE INVENTION

Figure 1:
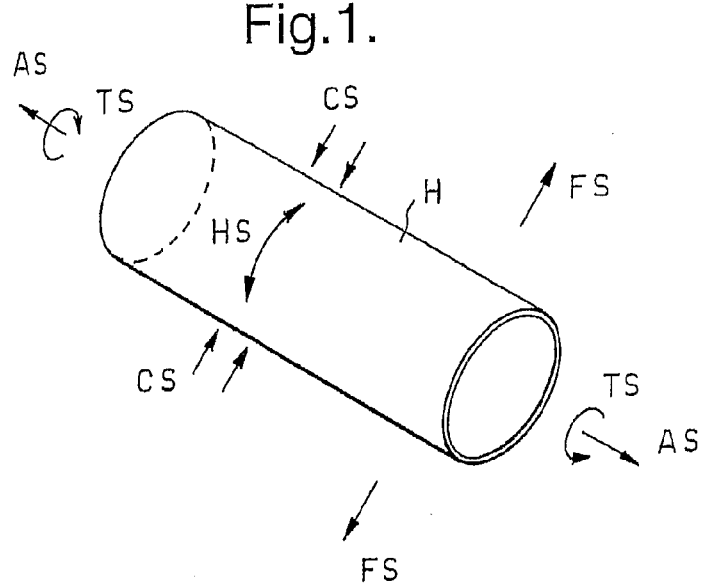
FIG. 1 is a schematic diagram showing the principle stresses to which the hose according to the invention may be subjected in operation.

The use of a flexible non-rigid material makes it easy to wind the outer gripping member around the hose, especially in comparison with a conventional steel outer gripping member, which is inflexible and rigid. It will of course be appreciated that the conventional steel gripping member can be wrapped about the hose, but this is does not fall within the normal meaning of flexible, i.e., "able to be bent easily without breaking." A conventional steel gripping member requires a special machine capable of winding the metal around the hose, whereas the flexible gripping member could in principle be wound around the hose by a human operator, although a machine would still normally be required to achieve the correct level of tension. In the preferred embodiment the outer gripping member has sufficiently low bending stiffness that it is incapable of supporting its own weight in the longitudinal direction of thereof.

It will of course be appreciated that the flexibility of the outer gripping member should be sufficient that it can be wound around the rest of the hose without breaking, and can cope with the bending stresses applied to the hose when in use without breaking.

Thus, the outer gripping member can be like a rope or ribbon which can be wound around the hose, without the necessity of applying the large bending forces required to wind a conventional steel gripping member around the hose.

The preferred properties of the outer gripping member, in addition to the minimal bending stiffness, is that it has high tensile strength, it is creep resistant and/or has minimal torsional resistance.

These properties enable the outer gripping member to be easily wound around the hose, while at the same time enable it to maintain a high winding tension to press against the inner layers of the hose.

It is envisaged that the outer gripping member will preferably be provided as a solid (i.e. non-hollow) member.

In a preferred embodiment the outer gripping member is formed of a plurality of yarns each themselves formed of a plurality of twisted or untwisted fibres. In an alternative embodiment, the outer gripping member is a flexible non-rigid monofilament. In an alternative embodiment, the outer gripping member may be formed of longitudinal fibres (metal and/or polymeric) embedded in a flexible non-rigid polymeric matrix; the fibres may be monofilaments or small metal wires.

The use of a flexible non-rigid outer gripping member has been found to confer a number of advantages over composite hose incorporating a conventional steel outer gripping member. First, the hose can be manufactured more easily, because it is easier to apply the outer gripping member to the rest of the hose. Second, the material of the outer gripping member is more elastic than a conventional steel gripping member, therefore does not have a sudden failure point—instead failure is more gradual. Third, the outer gripping member can lead to an improvement in the burst resistance of the hose because, owing to the minimal bending stiffness of the outer gripping member, it is possible to increase the thickness of the outer gripping member, and therefore its strength, compared with a conventional steel gripping member, without affecting the ease of its application to the rest of the hose—on the other hand, if the thickness of a conventional steel gripping member is increased, it eventually becomes impractical to wind it around the hose.

It will, of course, be appreciated that additional layers may be provided between the tubular body and the outer gripping member, which would be applied before the outer gripping member is wound around the tubular body.

Most preferably the tubular body comprises a sealing layer sandwiched between inner and outer reinforcing layers.

Preferably, the hose further comprises an axial strengthening means adapted to reduce deformation of the tubular body when the tubular body is subjected to axial tension, and the axial strengthening means is further adapted to exert a radially inward force on at least part of the tubular body when axial strengthening means is subjected to axial tensioning.

In a particularly preferred embodiment, the failure strain of the tubular body and the axial strengthening means are within the range of 1 to 10%. More preferably the failure strain is in excess of 5% at ambient and cryogenic temperatures.

By means of this arrangement, the axial strengthening means improves the ability of the hose to cope with axial stresses, and at the same time can contribute to the structural integrity of the hose during axial tensioning by pressing against at least part of the tubular body. In addition, the materials of the tubular body and the axial strengthening means are advantageously compatible so that they each perform in a similar manner when in operation, so that no single component is subjected to excessive stresses and strains. This means that the materials of the tubular body and the axial strengthening means respond to strain in a similar manner. A bend strain (for a cylindrical component) of at least 3% is generally needed for the type of hose applications primarily envisaged by the present invention. While, inter-layer slip and the straightening of helically oriented components will account for some of this slip, there will still be a resultant strain in the order of 1% acting on the structural components of the hose wall. This compares to a typical yield strain of 0.2% for metals.

It is particularly preferred that the axial strengthening means is made of a non-metallic material, especially a plastics material—suitable materials are discussed in detail below. This is because metallic materials are unlikely to have the desired strain characteristics.

It is preferred that the tubular body and the axial strengthening means comprise the same material, most preferably ultra high molecular weight polyethylene (UHMWPE), as described in further detail below.

Preferably, a further reinforcing layer is provided between the outer gripping member and the axial strengthening means.

The ultimate strength of the reinforcing layer(s) is preferably between 100 and 700 kN for an 8" (200 mm) diameter hose. It is preferable that the bend strain at failure of the reinforcing layer(s) is in the range 2% to 15%. Desirably, further reinforcing layer(s) are the same material as the axial strengthening means, most preferably UHMWPE.

Preferably the axial strengthening means comprises a generally tubular sheath formed of a sheet of material provided in a tubular shape, such that the sheath can maintain the integrity of its tubular shape when subjected to axial tension. The hose may be provided with two or more tubular sheaths in order to further improve the performance of the hose under axial tension.

In a particularly advantageous embodiment the axial strengthening means is provided in the form of a generally tubular braid. In this specification the term "braid" refers to a material which is formed of two or more fibres or yarns which have been intertwined to form an elongated structure. It is a feature of braid that it can elongate when subjected to an axial tension. It is a further feature of braid that, when provided in a tubular form, its diameter will reduce when the braid is subjected to axial tension. Thus by providing a tubular braid around the tubular body, or within the structure of the tubular body, the braid will exert a radially inward force on at least part of the tubular body when subjected to axial tension.

It is preferred that the entire tubular sheath is provided in the form of the braid. However, it is possible for only one or more parts of the length of the tubular sheath to be provided in the form of the braid.

It is also preferred that the braid extends all the way around the circumference of the tubular sheath. However, it is possible for only part of the circumference of the tubular sheath to be provided in the form of the braid.

The braid may be provided in a biaxial form (i.e. in which the braid is formed of only two intertwining fibres or yarns) or in a triaxial form (i.e. in which there are also longitudinally extending fibres or yarns, for increased axial strength).

Although it is preferred to provide the axial strengthening means in the form of a braid, it may be provided in other forms which meet the functional requirements specified above. Thus, the axial strengthening means may be provided as a suitable arrangement of cords or ropes helically wrapped around the tubular body.

The materials of construction of the hose should be selected to enable the hose to perform in the environment for which it is intended. Thus, there is a need for the hose to be able to transport pressurised fluids therethrough without leakage of the fluid through the walls of the hose. There is also a need for the hose to withstand repeated flexing, and to withstand the axial stresses caused by the combination of the hose and fluid weight. Also, if the hose is intended for use in transporting cryogenic fluids, the materials should be capable of operating at extremely cold temperatures without any significant reduction in performance.

The main purpose of the or each reinforcing layer is to withstand the hoop stresses which the hose is subjected to during transport of fluids therethrough. Thus, any reinforcing layer which has the required degree of flexibility, and which can withstand the necessary stresses, will be adequate. Also, if the hose is intended for transporting cryogenic fluids, then the or each reinforcing layer must be able to withstand cryogenic temperatures.

We prefer that the or each reinforcing layer is formed of a sheet of material which has been wound into a tubular form by winding the sheet material in a helical manner. This means that the or each reinforcing layer does not have much resistance to axial tension, as the application of an axial force will tend to pull the windings apart. The or each reinforcing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose.

In the preferred embodiment each reinforcing layer comprises a fabric, most preferably a woven fabric. The or each reinforcing layer may be a natural or synthetic material. The or each reinforcing layer is conveniently formed of a synthetic polymer, such as a polyester, a polyamide or a polyolefin. The synthetic polymer may be provided in the form of fibres, or a yarn, from which the fabric is created.

When the or each reinforcing layer comprises a polyester, then it is preferably polyethylene terephthalate.

When the or each reinforcing layer comprises a polyamide, then it may be an aliphatic polyamide, such as a nylon, or it may be an aromatic polyamide, such as an aramid compound. For example, the or each reinforcing layer may be a poly-(p-phenyleneterephthalamide) such as KEVLAR (registered trade mark).

When the or each reinforcing layer comprises a polyolefin, then it may be a polyethylene, polypropylene or polybutylene homopolymer, or a copolymer or terpolymer thereof, and is preferably monoaxially or biaxially oriented. More preferably, the polyolefin is a polyethylene, and most preferably the polyethylene is a high molecular weight polyethylene, especially UHMWPE.

The UHMWPE used in the present invention would generally have a weight average molecular weight above 400,000, typically above 800,000, and usually above 1,000,000. The weight average molecular weight would not usually exceed about 15,000,000. The UHMWPE is preferably characterised by a molecular weight from about 1,000,000 to 6,000,000. The UHMWPE most useful in the present invention is highly oriented and would usually have been stretched at least 2-5 times in one direction and at least 10-15 times in the other direction.

The UHMWPE most useful in the present invention will generally have a parallel orientation greater than 80%, more usually greater than 90%, and preferably greater than 95%. The crystallinity will generally be greater than 50%, more usually greater than 70%. A crystallinity up to 85-90% is possible.

UHMWPE is described in, for example, U.S. Pat. Nos. 4,344,908, 4,411,845, 4,422,993, 4,430,383, 4,436,689, EP-A-183285, EP-A-0438831, and EP-A-0215507.

It is particularly advantageous that the or each reinforcing layer comprises a highly oriented UHMWPE, such as that available from DSM High Performance Fibres BV (a Netherlands company) under the trade name DYNEEMA, or that available from the US corporation AlliedSignal Inc. under the trade name SPECTRA.

Additional details about DYNEEMA are disclosed in a trade brochure entitled "DYNEEMA; the top performance in fibers; properties and application" issued by DSM High Performance Fibers BV, edition February 1998. Additional details about SPECTRA are disclosed in a trade brochure entitled "Spectra Performance Materials" issued by Allied-Signal Inc., edition May 1996. These materials have been available since the 1980s.

In the preferred embodiment, the or each reinforcing layer comprises a woven fabric formed of fibres arranged in a weft and warp direction. We have found that it is particularly advantageous if the or each reinforcing layer is arranged such that the fabric warp direction is at an angle of less than 20° to the axial direction of the hose; we also prefer that this angle is greater than 5°. In the preferred embodiment, the or each reinforcing layer is arranged such that the fabric warp direction is at an angle of from 10° to 20°, most preferably about 15°, to the axial direction of the hose.

The purpose of the sealing layer is primarily to prevent the leakage of transported fluids through the tubular body. Thus, any sealing layer which has the required degree of flexibility, and which can provide the desired sealing function, will be adequate. Also, if the hose is intended for transporting cryogenic fluids, then the sealing layer must be able to withstand cryogenic temperatures.

The sealing layer may be made from the same basic materials as the or each reinforcing layer. As an alternative, the sealing layer may be a fluoropolymer, such as: polytetrafluoroethylene (PFTE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon-perfluoralkoxy—available from DuPont Fluoroproducts under the trade name Teflon PFA. These films may be made by extrusion or by blowing.

We prefer that the sealing layer is formed of a sheet of material which has been wound into a tubular form by winding the sheet material in a helical manner. As with the reinforcing layers, this means that the or each sealing layer does not have much resistance to axial tension, as the application of an axial force will tend to pull the windings apart. The sealing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose. If desired the sealing layer may comprise one or more heat shrinkable sealing sleeves (i.e. tubular in form) which are arranged over the inner reinforcing layer.

We prefer that the sealing layer comprises a plurality of overlapping layers of film. Preferably there would be at least 2 layers, more preferably at least 5 layers, and still more preferably at least 10 layers. In practice, the sealing layer may comprise 20, 30, 40, 50, or more layers of film. The upper limit for the number of layers depends upon the overall size of the hose, but it is unlikely that more than 100 layers would be required. Usually, 50 layers, at most, will be sufficient. The thickness of each layer of film would typically be in the range 50 to 100 micrometers.

It will, of course, be appreciated that more than one sealing layer may be provided.

A particularly preferred embodiment of the sealing layer is described below.

The axial strengthening means may also be formed of the same material as the or each reinforcing layer. Thus, it will be clear that the axial strengthening means, the or each reinforcing layer and the sealing layer may all be formed from the same basic compound. However, the form of the compound must be different in order to provide the required function, i.e., the axial strengthening means provides an axial reinforcement function, the or each reinforcing layer provides reinforcement against hoop stresses, and the sealing layer provides a sealing function. We have found that the UHMWPE materials are most suitable, particularly the DYNEEMA and SPECTRA products. These material have also been found to work well in cryogenic conditions. The preferred parameters of the UHMWPE (molecular weight range, etc) discussed above in relation to the reinforcing layers, are also appropriate to the axial strengthening means. In this regard is should be noted, however, that the parameters of the UHMWPE used in the axial strengthening means need not be the same as the parameters of the UHMWPE used in the reinforcing layers.

It would be possible for the axial strengthening means to be provided within the layers of the tubular body. However we prefer than the axial strengthening means is positioned between the tubular body and the outer gripping member. In an another preferred embodiment, the axial strengthening means is provided within the layers of the tubular body, and a further axial strengthening means is also provided between the tubular body and the outer gripping member.

When the hose is intended for cryogenic applications, then it is desirable to provide insulation over the tubular body. The insulation could be provided between the outer wire and the tubular sheath and/or outside the outer wire. The insulation may comprise material conventionally used to provided insulation in cryogenic equipment, such as a synthetic foam material. It is preferred that the axial strengthening means is also provided around the insulating layer to compress the insulation layers and maintain their structural integrity. The axial strengthening means around the insulation layer is preferably provided in addition to the axial strengthening means between the outer gripping member and the tubular body. A particular suitable form of insulation is provided in further detail below.

According to another aspect of the invention there is provided a hose comprising a tubular body of flexible material arranged between inner and outer elongate gripping members, wherein the tubular body comprises a sealing layer and at least one reinforcing layer, and wherein the outer gripping member is made of a flexible polymeric material capable of being wound around the tubular body. The hose according to this aspect of the invention may be provided with any desired combination of the additional features described in relation to the hose according to the first aspect of the invention. According to another aspect of the invention there is provided a method of making a hose comprising:

(a) winding an elongate inner gripping member around a tubular mandrel to form an inner coil;

(b) optionally wrapping an inner reinforcing layer, in sheet form, helically around the inner coil and the mandrel;

(c) wrapping a sealing layer, in sheet form, helically around the inner reinforcing layer;

(d) wrapping an outer reinforcing layer, in sheet form, helically around the sealing layer.

(e) winding an elongate outer gripping member, formed of a flexible polymeric material, around the outer reinforcing layer to form an outer coil;

(f) securing the ends of the hose produced in step (e); and (g) removing the hose from the mandrel.

Preferably, the outer gripping member has sufficiently low bending stiffness that the outer gripping member is incapable of supporting its own weight in the longitudinal direction of thereof.

Desirably the outer gripping member is provided in the form of a flexible rope or ribbon.

Preferably, the method further comprises the following step, between steps (d) and (e):

(d1) pulling a tubular axial strengthening sheath over a free end of the mandrel, so that the mandrel extends within the axial strengthening sheath, then pulling the axial strengthening sheath along the mandrel so that it at least partially covers the tubular body, wherein the axial strengthening sheath is adapted to reduce deformation of the tubular body when the tubular body is subjected to axial tension, and is adapted to exert a radially inward force on at least part of the tubular body when axial strengthening sheath is subjected to axial tension.

Preferably the gripping members and the sheet material are applied under tension in order to provide the hose with good structural integrity.

Preferably the sheet material in step (b) comprises two reinforcing layers sandwiching a sealing layer, as described above. In the preferred embodiment, an inner reinforcing layer, in sheet form, is wrapped helically around the inner gripping member and the mandrel; then the sealing layer, in sheet form, is wrapped helically around the inner reinforcing layer; then the outer reinforcing layer, in sheet form, is wrapped around the sealing layer. Usually a plurality of sealing layers would be applied.

The tubular axial strengthening sheath may be the same as the axial strengthening sheath described above, and is preferably a braid.

Preferably the inner and outer gripping members are applied in a helical configuration having the same pitch, and the position of the coils of the outer gripping member are positioned half a pitch length offset from the position of the coils of the inner gripping member.

The hose according to the invention may be provided with any of the features of the hose described in our WO01/96772, WO 2004/044472 and WO 2004/079248. In particular, the hose may be provided with an end fitting as described in our WO01/96772 and WO 2004/044472.

In the above described aspects of the invention, the gripping members typically each comprise a helically wound gripping member, such that they form a coil, particularly a helically wound wire. The helices of the gripping members are typically arranged such that they are offset from one another by a distance corresponding to half the pitch of the helices. The purpose of the gripping members is to grip the tubular body firmly therebetween to keep the layers of the tubular body intact and to provide structural integrity for the hose. The inner gripping member is preferably a metal, in particular, steel, austenitic stainless steel or aluminium. If desired, the inner gripping member may be galvanised or coated with a polymer. It will be appreciated that the inner gripping member is preferably rigid and relatively inflexible, as it has to serve the function of providing an inner supporting structure for the hose. Typically the inner gripping member is sufficiently inflexible that it must to be wound around the mandrel using a machine capable of bending it. The inner gripping member is preferably sufficiently rigid that it is capable of supporting its own weight in the longitudinal direction thereof. It will be appreciated that one of the distinctions between the preferred inner gripping member and the outer gripping member is that it will independently retain any shape it is bent into (e.g. a coil) without the need for any additional support, whereas the outer gripping member requires the support of the rest of the hose, and also a tension applied to the ends thereof, in order to maintain its shape.

It will be appreciated that although the gripping members may have a considerable tensile strength, the arrangement of the wires in coils means that the gripping members can deform when subjected to relatively small axial tension. Any significant deformation in the coils will quickly destroy the structural integrity of the hose.

In accordance with the invention, the outer gripping member is made of a flexible non-rigid material. The outer gripping member may be mainly or entirely a polymeric material, particularly polymeric fibres, or may be mainly or entirely a metal, particularly metal fibres, such as a metal (typically steel) cable, wire or rope, provided that the gripping member is flexible and non-rigid. In an embodiment, the outer gripping member is a combination of a metal, particularly metal fibres, such as steel, and a polymeric material, particularly polymeric fibres, such as UHMWPE.

Most preferably, the outer gripping member is made of UHMWPE, as described above. Alternatively, the outer gripping member may be made of Kevlar (RTM) or polyester. The outer gripping member may also include reinforcing fibres such as glass or carbon in a matrix.

The flexibility of the outer gripping member should be sufficient to enable it to be wound around the hose.

This use of the flexible outer gripping member makes it possible to produce a hose with high strength without increasing its weight and bending resistance. This makes it possible to apply higher tensions to hold the hose structure together and it minimises the spring back associated with the metal wires described in the prior art, which is caused by the elastic component of bending stored in a bent metal wire. In addition, with the flexible outer gripping member, it is not necessary to apply the effort of plastically bending a (larger diameter) metal wire—this improves on the control of the applied tension. The flexible gripping member overcomes the disadvantage of using a homogenous metal wire where for a given material where increasing the wire's strength can only be done by increasing the wire diameter (strength is proportional to square of diameter. i.e. area), but this disadvantageously significantly increases the bending stiffness (stiffness is proportional to diameter to the power four i.e. second moment of area).

The hose according to the invention can be provided for use in a wide variety of conditions, such as temperatures above 100° C., temperatures from 0° C. to 100° C. and temperatures below 0° C. With a suitable choice of material, the hose can be used at temperatures below −20° C., below −50° C. or even below −100° C. For example, for LNG transport, the hose may have to operate at temperatures down to −170° C., or even lower. Furthermore, it is also contemplated that the hose may be used to transport liquid oxygen (bp −183° C.) or liquid nitrogen (bp −196° C.), in which case the hose may need to operate at temperatures of −200° C. or lower.

The hose according to the invention can also be provided for use at a variety of different duties. Typically, the inner diameter of the hose would range from about 50 mm to about 600 mm, more typically from about 200 mm to about 400 mm. In general, the operating pressure of the hose would be in the range from about 500 kPa gauge up to about 2000 kPa gauge, or possibly up to about 2500 kPa gauge. These pressures relate to the operating pressure of the hose, not the burst pressure (which must be several times greater). The volumetric flow rate depends upon the fluid medium, the pressure and the inner diameter. Flowrates from 1000 m³/h up to 12000 m³/h are typical.

The hose according to the invention can also be provided for use with corrosive materials, such as strong acids, FIG. 1 shows the stresses to which a hose H is normally subjected to during use. The hoop stress is designated by the arrows HS and is the stress that acts tangentially to the periphery of the hose H. The axial stress is designated by the arrows AS and is the stress which acts axially along the length of the hose H. The flexing stress is designated FS and is the stress which acts transverse to the longitudinal axis of the hose H when it is flexed. The torsional stress is designated TS and is a twisting stress which acts about the longitudinal axis of the hose. The crushing stress is designated CS and results from loads applied radially to the exterior of the hose H.

The hoop stress HS is generated by the pressure of the fluid in the hose H. The axial stress AS is generated by the pressure of the fluid in the hose and also by the combination of the weight of the fluid in the hose H and by the weight of the hose H itself. The flexing stress FS is caused by the requirement to bend the hose H in order to position it properly, and by movement of the hose H during use. The torsional stress TS is caused by twisting of the hose. Prior art hose is generally capable of withstanding the hoop stresses HS, the flexing stresses FS and the torsional stresses TS, but is less capable of withstanding the axial stresses AS. For this reason, when prior art hoses were subjected to large axial stresses AS they generally had to be supported, to minimise the axial stresses AS.

Figure 2:
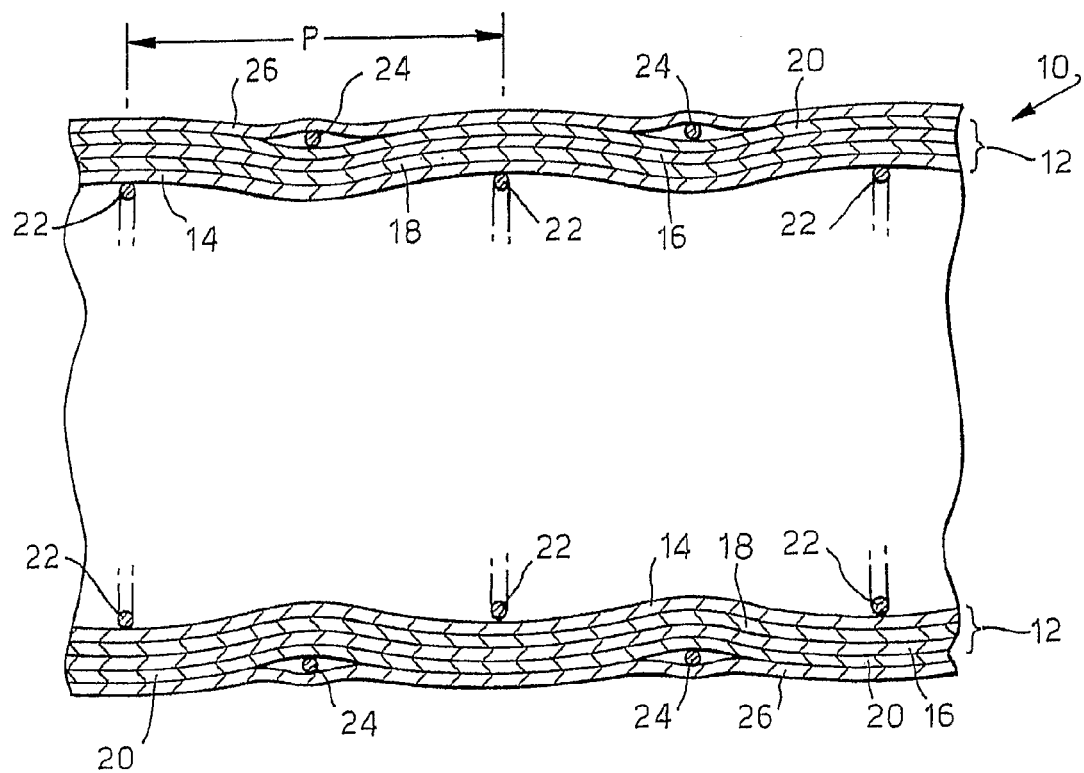
FIG. 2 is a schematic cross-sectional view of a hose according to the invention.

The problem of withstanding the axial stresses AS has been solved by the present invention. In FIG. 2 a hose in accordance with the invention is generally designated 10. In order to improve the clarity the winding of the various layers in FIG. 2, and in the other Figures, has not been shown.

The hose 10 comprises a tubular body 12 which comprises an inner reinforcing layer 14, an outer reinforcing layer 16, and a sealing layer 18 sandwiched between the layers 14 and 16. A generally tubular sheath 20, which provides axial strengthening, is disposed around the outer surface of the outer reinforcing layer 16.

The tubular body 12 and the tubular sheath 20 are disposed between an inner helically coiled wire 22, made of steel, and an outer helically coiled wire 24, made of a flexible polymer, such as UHMWPE. The inner and outer wires 22 and 24 are disposed so that they are offset from one another by a distance corresponding to half the pitch length of the helix of the coils.

The hose also includes end fittings which are illustrated schematically in FIG. 1 and are designated by the reference numeral 200.

An insulation layer 26 is disposed around the outer wire 24. The insulation layer may be a conventional insulating material, such as a plastics foam, or may be a material described below in relation to FIG. 7.

Figure 3:
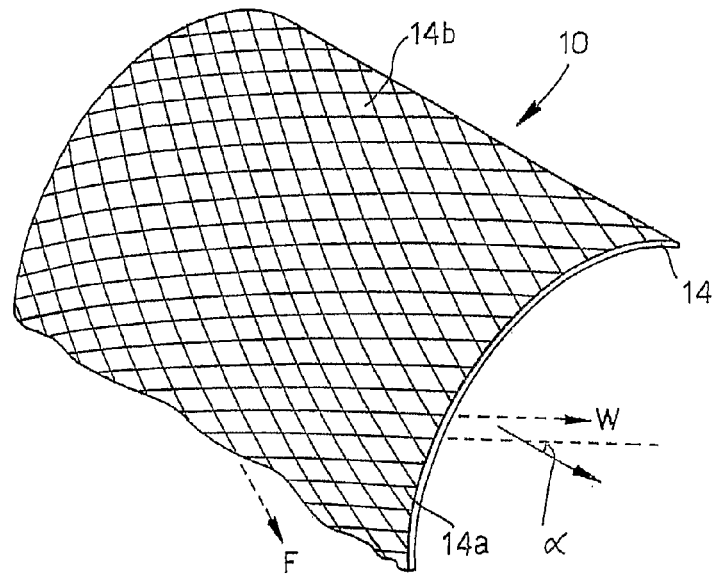
FIG. 3 is a sectional view showing the arrangement of a reinforcing layer of the hose according to the invention.

The reinforcing layers 14 and 16 comprise woven fabrics of a synthetic material, such as UHMWPE or aramid fibres. FIG. 3 illustrates the inner reinforcing layer 14, from which it will be clear that the inner reinforcing layer 14 comprises fibres 14a arranged in a warp direction W, and fibres 14b arranged in a weft direction F. In FIG. 3 only the layer 14 has been shown, in order to improve the clarity. We have unexpectedly found that the axial strength of the hose 10 can be improved by arranging the inner reinforcing layer 14 such that the warp direction W is at a low angle, of less than 20° and typically around 15° to the longitudinal axis of the hose 10. This angle is indicated by the symbol α in FIG. 3. The structure and orientation of the outer reinforcing layer 16 is substantially identical to the inner reinforcing layer 14; the angle α for the outer reinforcing layer 16 may be the same as, or different from, the angle α for the inner reinforcing layer 14.

The sealing layer 18 comprises a plurality of layers of plastics film which are wrapped around the outer surface of the inner reinforcing layer 14 to provide a fluid tight seal between the inner and outer reinforcing layers 14 and 16.

The hose 10 further includes a reinforcing layer 21 disposed between the sheath 20 and the outer wires 24. The reinforcing layer 21 may have similar characteristics to the sheath 20 and the tubular body 12.

Figure 4A:
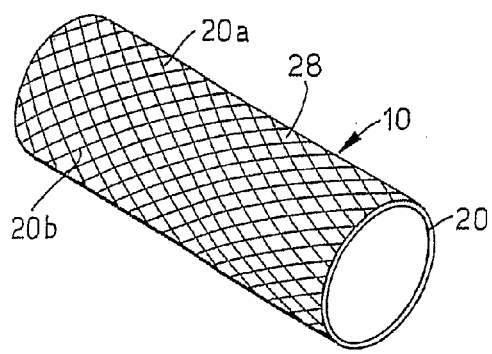
FIG. 4A is a sectional view showing the arrangement of a tubular axial strengthening sheath of the hose according to the invention, the axial strengthening sheath being in a relaxed condition.
Figure 4B:
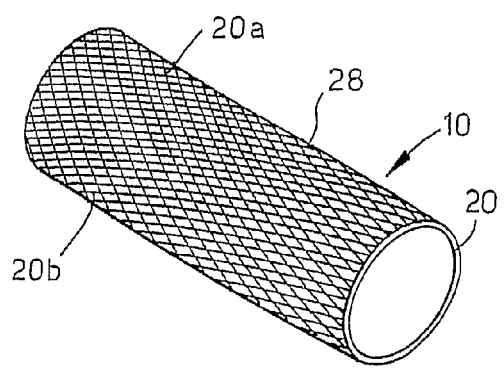
FIG. 4B is a sectional view showing the arrangement of a tubular axial strengthening sheath of the hose according to the invention, the axial strengthening sheath being in a tightened condition.

The tubular sheath 20 is formed of two sets of fibres 20a and 20b which are braided to form a tubular braid. This is shown in FIGS. 4A and 4B—in these Figures only the tubular sheath 20 has been shown, in order to improve the clarity. There are spaces 28 between the sets of fibres 20a and 20b, so that when the tubular sheath 20 is subjected to axial tensioning the fibres 20a and 20b can contract moving into the spaces 28. This acts in a way to try to reduce the diameter of the tubular sheath 20, which causes it to tighten around the tubular body 12, thereby increasing the structural integrity and burst pressure of the hose 10. FIG. 4B shows the tubular sheath 20 in the tightened condition.

Figure 6:
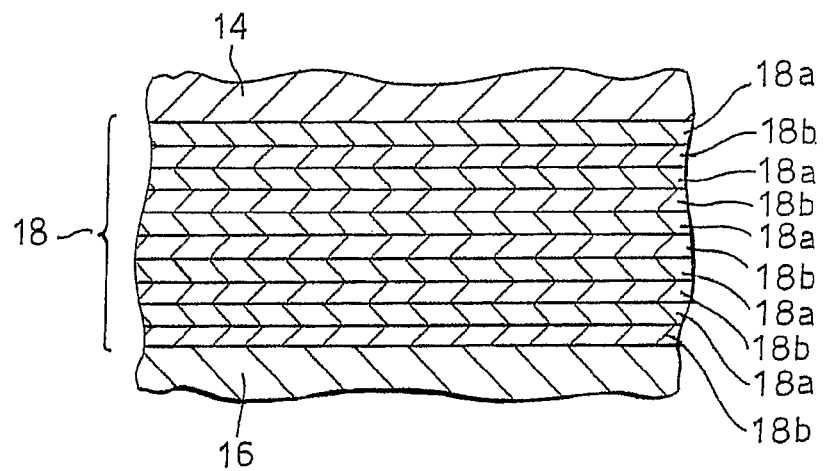
FIG. 6 is a cross-sectional view showing the a sealing layer of a hose according to the invention.

The sealing layer 18 is shown in greater detail in FIG. 6. The provision of the sealing layer 18 improves the resistance of hose to the flexing stress FS and the hoop stress HS.

As shown in FIG. 6, the sealing layer 18 comprises a plurality of layers 18a of a film made of a first polymer (such as a highly oriented UHMWPE) interleaved with a plurality of layers 18b of a film made of a second polymer (such as PFTE or FEP), the two polymers having a different stiffness. The layers 18a and 18b have been wrapped around the outer surface of the inner reinforcing layer 14 to provide a fluid tight seal between the inner and outer reinforcing layers 14 and 16. As mentioned above, the layers 18a and 18b do not necessarily have to be arranged in an alternative fashion. For example, all the layers 18a could be arranged together, and all the layers 18b could be arranged together.

Figure 7:
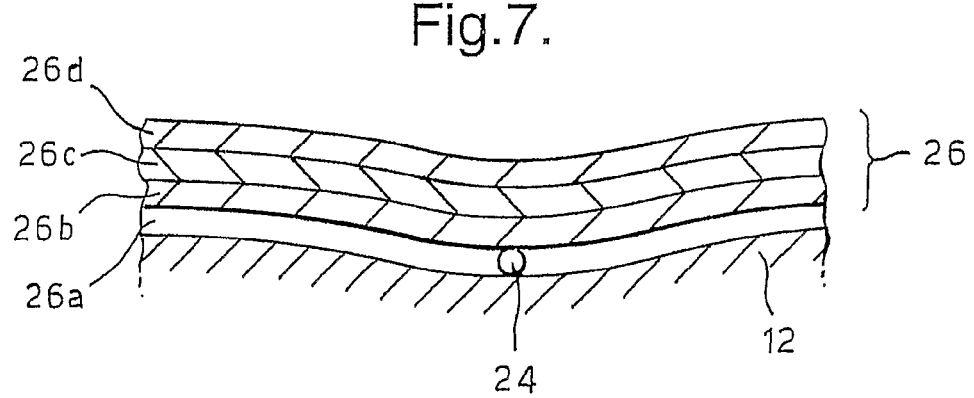
FIG. 7 is a cross-sectional view showing an insulation layer of the hose of FIG. 2; in greater detail.

The insulation layer 26 is shown in greater detail in FIG. 7. shows the insulation layer 26 in greater detail. The insulation layer is primarily concerned with improving the resistance of hose to the flexing stress FS, and with insulating the hose The insulation layer 26 comprises an inner layer 26a which is formed of a polyurethane which has been sprayed, poured, or otherwise applied, over the tubular body 12 and the outer wire 24. After hardening, the polyurethane layer 26a forms a solid matrix within which the outer wire 24 is embedded. This helps to keep the outer wire 24 fixed in position. In a preferred embodiment, the inner layer 26a is provided with air bubbles therein.

The insulation layer 26 includes a layer 26b over the layer 26a. The layer 26b comprises a fabric formed of basalt fibres. The layer 26b provides most of the insulating properties of the hose 10.

The insulation layer 26 further includes a layer 26c over the layer 26b. The layer 26c comprises an UHMWPE such as DYNEEMA or SPECTRA. The purpose of the layer 26c is primarily to provide strengthening against hoop and flexing stresses.

The insulation layer 26 further includes a compression layer 26d. The purpose of the compression layer 26d is to compress the layer 26b, as we have found that the insulation properties of the basalt fabric layer 26b are much improved under compression. The compression layer 26d may, for example, comprise a rope or cord which is wrapped tightly around the layer 26c. Preferably, the compression layer 26d comprises an axial strengthening sheath like the sheath 20 described above.

A further polyurethane layer (not shown) containing gas bubbles may be provided over the layer 26d to further improve the insulation properties and the buoyancy of the hose 10. A still further polyurethane layer (not shown) not containing gas bubbles may be provided over the gas-containing polyurethane layer. The further polyurethane layer could additionally, or instead, be provided within the layer 26d. It is also possible for the layer 26a itself to contain the gas bubbles.

The hose 10 can be manufactured by the following technique. As a first step the inner wire 22 is wound around a support mandrel (not shown), in order to provide a helical arrangement having a desired pitch. The diameter of the support mandrel corresponds to the desired internal diameter of the hose 10. The inner reinforcing layer 14 is then wrapped around the inner wire 22 and the support mandrel, such that warp direction W is set at the desired angle α.

A plurality of layers of the plastics films 18a, 18b making up the sealing layer 18 are then wrapped around the outer surface of the inner reinforcing layer 14. Usually, the films 18a and 18b would have a length substantially less than the length of the hose 10, so that a plurality of separate lengths of the films 18a and 18b would have to be wound around the inner layer 14. The films 18a and 18b are preferably arranged in an alternating fashion through the thickness of the sealing layer 18. Typically there might be five separate layers of the films 18a and 18b through the thickness of the sealing layer.

The outer reinforcing layer 16 is then wrapped around the sealing layer 18, such that the warp direction W is set at the desired angle (which may be α, or may be some other angle close to α). The tubular axial strengthening sheath 20 is drawn over the outside of the outer reinforcing layer 16. The further reinforcing layer 21 is then wrapped around the sheath 20.

The outer wire 24 is then wrapped around the further reinforcing layer 21, in order to provide a helical arrangement having a desired pitch. The pitch of the outer wire 24 would normally be the same as the pitch of the inner wire 22, and the position of the wire 24 would normally be such that the coils of the wire 24 are offset from the coils of the wire 22 by a distance corresponding to half a pitch length; this is illustrated in FIG. 2, where the pitch length is designated p.

A polyurethane resin is then be sprayed over the outer surface of the reinforcing layer 21 to form a resin coating over the reinforcing layer 21 and the outer wire 24. The resin may then be left to harden, in order to form the layer 26a. The resin may be aerated before hardening (typically before spraying or painting) to provide gas bubbles therein. The basalt fabric layer 26b is then wrapped around the polyurethane layer 26a, and the UHMWPE layer 26c is then wrapped around the layer 26b. Finally, the compression layer 26d is applied over the layer 26c.

The ends of the hose 10 may be sealed by crimping a sleeve onto an insert inside the hose 10. This termination is generally applied after the hose 10 as been removed from the mandrel.

Figure 5A:
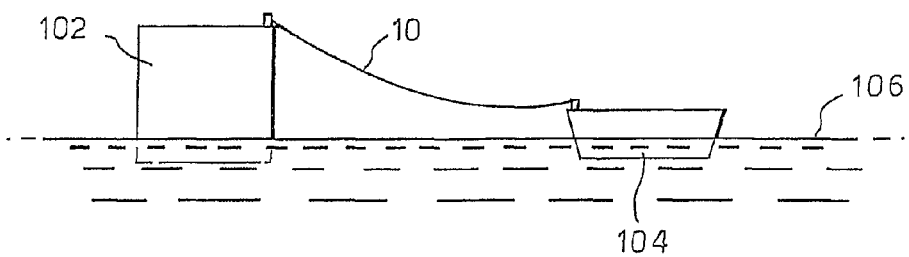
FIGS. 5A, 5B 5C and 5D show four applications of hose according to the present invention.
Figure 5B:
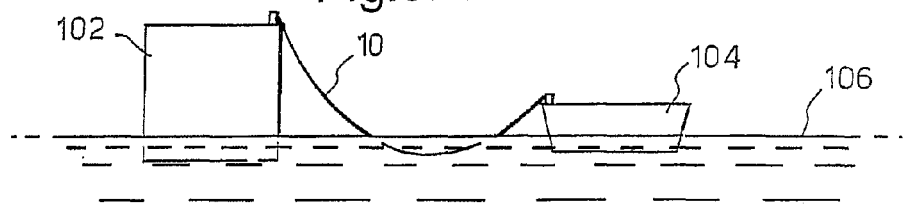
Figure 5C:
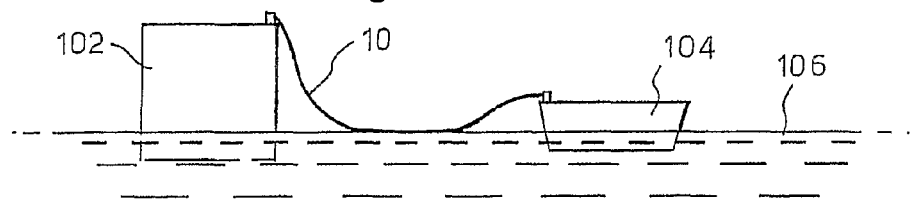
Figure 5D:
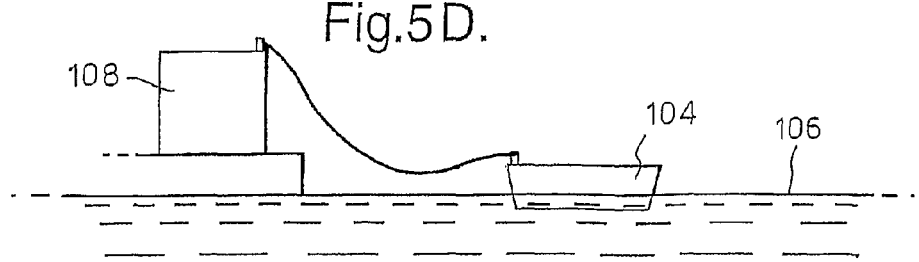

FIGS. 5A to 5D show three applications for the hose 10. In each of FIGS. 5A to 5C a floating production, storage and offloading vessel (FPSO) 102 is linked to a LNG carrier 104 by means of a hose 10 according to the invention. The hose 10 carries LNG from a storage tank of the FPSO 102 to a storage tank of the LNG carrier 104. In FIG. 5A, the hose 10 lies above the sea level 106. In FIG. 5B, the hose 10 is submerged below the sea level 106. In FIG. 5C, the hose 10 floats near the surface of the sea. In each case the hose 10 carries the LNG without any intermediate support. In FIG. 5D the LNG carrier is linked to a land-based storage facility 108 via the hose 10.

The hose 10 may be used for many other applications apart from the applications shown in FIGS. 5A to 5C. The hose may be used in cryogenic and non-cryogenic conditions.

The invention claimed is:

1. A hose comprising a tubular body of flexible material arranged between elongate inner and outer gripping members, wherein the tubular body comprises a sealing layer and at least one reinforcing layer, and wherein the outer gripping member is flexible and non-rigid, has a sufficiently low bending stiffness such that it is incapable of supporting its own weight in the longitudinal direction thereof and is formed from a flexible and non-rigid material with a flexibility sufficient to enable it to be wound around the tubular body and wherein the inner gripping member is formed of a rigid material that is relatively inflexible compared with the outer gripping member.

2. A hose according to claim 1, wherein the outer gripping member is mainly or entirely formed of a polymeric material.

3. A hose according to claim 1, wherein the outer gripping member is formed of ultra high molecular weight polyethylene.

4. A hose according to claim 1, wherein the outer gripping member is mainly or entirely formed of a metal.

5. A hose according to claim 1, wherein the outer gripping member is provided in the form of a flexible non-rigid rope, wire, cable or ribbon.

6. A hose according to claim 1, wherein the outer gripping member is in the form of a yarn formed of a plurality of untwisted or twisted polymeric fibres.

7. A hose according to claim 1, wherein the outer gripping member is in the form of a flexible non-rigid monofilament.

8. A hose according to claim 1, wherein the inner gripping member is formed of a metal.

9. A hose according to claim 1, wherein the inner gripping member is formed of a steel.

10. A hose according to claim 1, wherein the inner and outer gripping members comprise helical coils.

11. A hose according to claim 1, wherein the tubular body comprises at least two reinforcing layers, and the sealing layer is disposed between two of the reinforcing layers.

12. A hose according to claim 1, further comprising an axial strengthening means comprising a generally tubular sheath formed of a sheet of material provided in a tubular shape, such that the tubular sheath can maintain the integrity of its tubular shape when subjected to axial tension.

13. A hose according to claim 1, wherein the axial strengthening means is provided in the form of a generally tubular braid.

14. A hose according to claim 2, wherein the outer gripping member is formed of ultra high molecular weight polyethylene.

15. A hose according to claim 4, wherein the outer gripping member has sufficiently low bending stiffness that it is incapable of supporting its own weight in the longitudinal direction of thereof.

16. A hose according to claim 15, wherein the outer gripping member is provided in the form of a flexible non-rigid rope, wire, cable or ribbon.

17. A hose according to claim 16, wherein the outer gripping member is in the form of a yarn formed of a plurality of untwisted or twisted polymeric fibres.

18. A hose according to claim 16, wherein the outer gripping member is in the form of a flexible non-rigid monofilament.

19. A hose according to claim 18, wherein the inner gripping member is formed of a rigid material which is relatively inflexible compared with the outer gripping member.

20. A hose according to claim 19, wherein the inner gripping member is formed of a metal.

21. A hose according to claim 20, wherein the inner gripping member is formed of a steel.

22. A hose according to claim 21, wherein the inner and outer gripping members comprise helical coils.

23. A hose according to claim 22, wherein the tubular body comprises at least two reinforcing layers, and the sealing layer is disposed between two of the reinforcing layers.

24. A hose according to claim 23, further comprising an axial strengthening means comprising a generally tubular sheath formed of a sheet of material provided in a tubular shape, such that the tubular sheath can maintain the integrity of its tubular shape when subjected to axial tension.

25. A hose according to claim 24, wherein the axial strengthening means is provided in the form of a generally tubular braid.

* * * * *